United States Patent
Makhervaks et al.

(10) Patent No.: US 7,487,153 B2
(45) Date of Patent: Feb. 3, 2009

(54) LOCKER MANAGER FOR MANAGING ACCESS TO SHARED RESOURCES

(75) Inventors: Vadim Makhervaks, Austin, TX (US); Zorik Machulsky, Geshr HaZiv (IL)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 10/907,590

(22) Filed: Apr. 7, 2005

(65) Prior Publication Data
US 2005/0240585 A1    Oct. 27, 2005

(30) Foreign Application Priority Data
Apr. 27, 2004    (EP)    .................................... 0409326

(51) Int. Cl.
*G06F 17/30* (2006.01)
(52) U.S. Cl. ........................... 707/8; 707/100; 709/229; 711/100
(58) Field of Classification Search ............... 707/8, 707/9, 100, 10, 201; 709/229, 226, 225, 709/216; 711/100, 147, 163
See application file for complete search history.

(56) References Cited

U.S. PATENT DOCUMENTS

| | | | | |
|---|---|---|---|---|
| 5,327,556 A | * | 7/1994 | Mohan et al. ............... | 707/8 |
| 5,596,754 A | * | 1/1997 | Lomet .......................... | 710/200 |
| 5,682,537 A | * | 10/1997 | Davies et al. ................ | 710/200 |
| 5,875,485 A | * | 2/1999 | Matsumoto ................... | 711/152 |
| 5,893,156 A | * | 4/1999 | Matsumoto ................... | 711/145 |
| 6,108,654 A | * | 8/2000 | Chan et al. ..................... | 707/8 |
| 6,330,612 B1 | * | 12/2001 | Boonie et al. ................ | 709/229 |
| 6,606,626 B1 | * | 8/2003 | Ponnekanti .................... | 707/8 |
| 6,751,616 B1 | * | 6/2004 | Chan ............................. | 707/8 |
| 6,850,938 B1 | * | 2/2005 | Sadjadi .......................... | 707/8 |
| 6,965,893 B1 | * | 11/2005 | Chan et al. ..................... | 707/8 |
| 2005/0138375 A1 | * | 6/2005 | Sadjadi ......................... | 713/167 |

OTHER PUBLICATIONS

Aldred et al., A Distributed Lock Manager on Fault Tolerant MPP, System Sciences, 1995, Proceedings of the Twenty-Eighth Hawaii International Conference on, vol. 1, Jan. 3-6, 1995, pp. 134-136 vol. 1.*

* cited by examiner

*Primary Examiner*—Greta L Robinson
(74) *Attorney, Agent, or Firm*—Howard M. Cohn; Lisa U. Jaklitsch

(57) ABSTRACT

A method and system for controlling access to computer resources by multiple software components is described. A locker manager is provided, which is adapted to manage access to shared computer resources by independent software components. If a particular hardware resource is not currently being used and is available, the locker manager grants a particular software component access to the particular computer resource and locks access thereto, wherein none of the other software components can access the particular computer resource until the particular software component has finished accessing the particular computer resource.

15 Claims, 3 Drawing Sheets

LOCKER MANAGER FOR MANAGING ACCESS TO SHARED RESOURCES

FIELD OF THE INVENTION

The present invention relates generally to management (e.g., synchronization) of different software entities, and particularly to management (e.g., synchronization) of independent software components running on the same or different processors, without any need to directly exchange any information between them or to share the software.

BACKGROUND OF THE INVENTION

Remote Direct Memory Access (RDMA) is a technique for efficient movement of data over high-speed transports. RDMA enables a computer to directly place information in another computer's memory with minimal demands on memory bus bandwidth and CPU processing overhead, while preserving memory protection semantics. RNIC is an RDMA-enabled NIC (Network Interface Controller). The RNIC may provide support for RDMA over TCP (transport control protocol). RDMA RNIC is also referred to as intelligent RNIC.

In addition to providing RDMA capabilities, the intelligent RNIC is expected to support multiple semantics. For example, it may operate as a regular Ethernet NIC providing a widely-used partial offload of a hardware checksum generation and validation. It may operate as an intelligent NIC providing full TCP termination. It may interface to enable software implementation of socket semantics. It may serve as an iSCSI (Internet Small Computer System Interface) target or initiator adapter, providing partial iSCSI acceleration.

Each one of the semantics capabilities may require a different software environment and different drivers to implement it. The drivers are not necessarily coupled or capable of communicating one with another due to various reasons. For example, the software/drivers may be implemented by different vendors, or the software/drivers may run in a virtualized environment, while others may run on host or embedded CPUs, etc.

An operating system (OS) generally provides services like semaphores, mutexes, spin-locks, etc., for synchronizing different software components. The synchronization schemes may depend on the operating system, and may require different software components to be aware of each other. Alternatively, a single software component may be used that provides such synchronization facilities and exclusive access to the shared hardware.

Such standard synchronization schemes may work well in an application with a single software component, e.g., a standard NIC driver. However, such schemes do not work effectively with multiple software interfaces, such as in intelligent RNIC.

SUMMARY OF THE INVENTION

The present invention seeks to provide an improved system and method for management (e.g., synchronization) of independent software components running on the same or different processors, without any need to directly exchange any information between them or to share the software, as is described more in detail herein below.

In accordance with a non-limiting embodiment of the present invention a locker manager is provided, which is adapted to manage access to shared computer resources by independent software components. If a particular hardware resource is not currently being used and is available, the locker manager grants a particular software component access to the particular computer resource and locks access thereto, wherein none of the other software components can access the particular computer resource until the particular software component has finished accessing the particular computer resource. Any other software component may read the locker manager to check whether the resource is used. If the other software component detects that the resource is locked for use, it does not attempt to access that resource.

In accordance with a non-limiting embodiment of the present invention, the locker manager includes a lock number register for allocating lock numbers to the software components, and a locker register that includes a locker value register for storing lock numbers and a locker status register for storing an indication whether the locker register is locked or unlocked.

In accordance with a non-limiting embodiment of the present invention, there is also provided a computer program product for controlling access to computer resources by multiple software components, wherein the computer program product includes instructions for operating a locker manager which is adapted to manage access to shared computer resources by independent software components, wherein in the instructions, if a particular hardware resource is not currently being used and is available, the locker manager grants a particular software component access to the particular computer resource and locks access thereto, wherein none of the other software components can access the particular computer resource until the particular software component has finished accessing the particular computer resource.

BRIEF DESCRIPTION OF THE DRAWINGS

The present invention will be understood and appreciated more fully from the following detailed description taken in conjunction with the appended drawings in which.

DETAILED DESCRIPTION OF EMBODIMENTS

Figure 1:
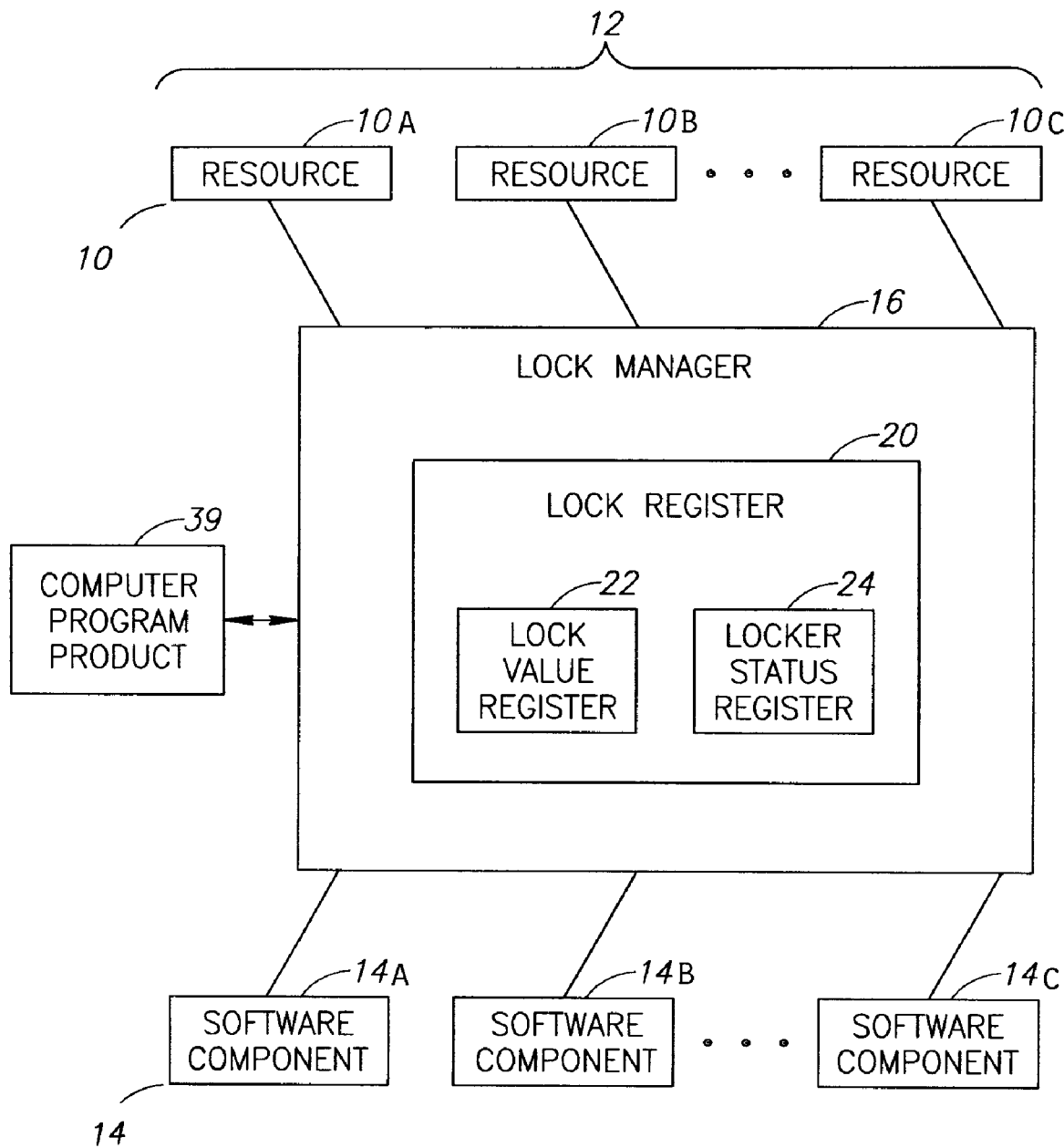
FIG. 1 is a simplified block diagram of managing access to computer resources in a system, in accordance with an embodiment of the present invention.

Reference is now made to FIG. 1, which illustrates managing access to computer resources 10, having a plurality of resources 10a, 10b and 10c, in a system 12, in accordance with an embodiment of the present invention.

The system 12, for which the present invention has application, may include many types of systems in various fields, such as but not limited to, distributed systems, intelligent NICs with multi-protocol interfaces, and many others. For example, system 12 may use RDMA protocol, such as but not limited to, intelligent RNIC, also referred to as RDMA NIC.

The present invention may synchronize access to shared resources 10 by independent software components 14 (e.g., drivers), having a plurality of software components 14a, 14b and 14c. The computer resources 10 may include, without limitation, various hardware resources (e.g., servers, computer peripherals, etc.), or even software resources (e.g., application programs and the like) or any combination thereof. The synchronization of the access to the resources 10 may be done simultaneously for the software components 14.

In accordance with a non-limiting embodiment of the present invention, a locker manager 16 is provided that manages and synchronizes access to the shared resources 10 by independent software components 14. The locker manager 16 may be embodied as hardware or software or a combination thereof.

Briefly, the locker manager 16 operates by granting access to only one of the software components 14, thereby effectively locking out the other software components 14. When one of the software components 14 wishes to obtain exclusive access to one of the hardware resources 10, that particular software component 14 checks if the locker manager 16 has "unlocked" access to that particular computer resource 10, meaning that that particular computer resource 10 is not currently being used and is available. If so, the locker manager 16 grants that particular software component 14 access to that particular computer resource 10, and "locks" access thereto, meaning that if the other software components 14 were to attempt gaining access to that particular computer resource 10, the locker manager 16 would indicate that the particular computer resource 10 is in use and currently inaccessible. When that particular software component 14 has finished accessing that particular computer resource 10, it indicates this to the locker manager and access thereto is unlocked, meaning that another software component 14 can now gain access thereto.

The locker manager 16 may include a lock number register 18 for allocating lock numbers to the software components 14, as is explained hereinbelow. The locker manager 16 may also include a locker register 20, which may comprise two sub-registers, one called locker value register 22 and the other called locker status register 24. The locker value register 22 has a bit or bits that store a lock number (called 'LockerValue') and the locker status register 24 has a bit or bits that indicate the locked or unlocked status of the locker register 20 (called 'LockerState'). The locker register 20 may be used to manage access to the desired computer resource 10, as is now explained.

Figure 2:
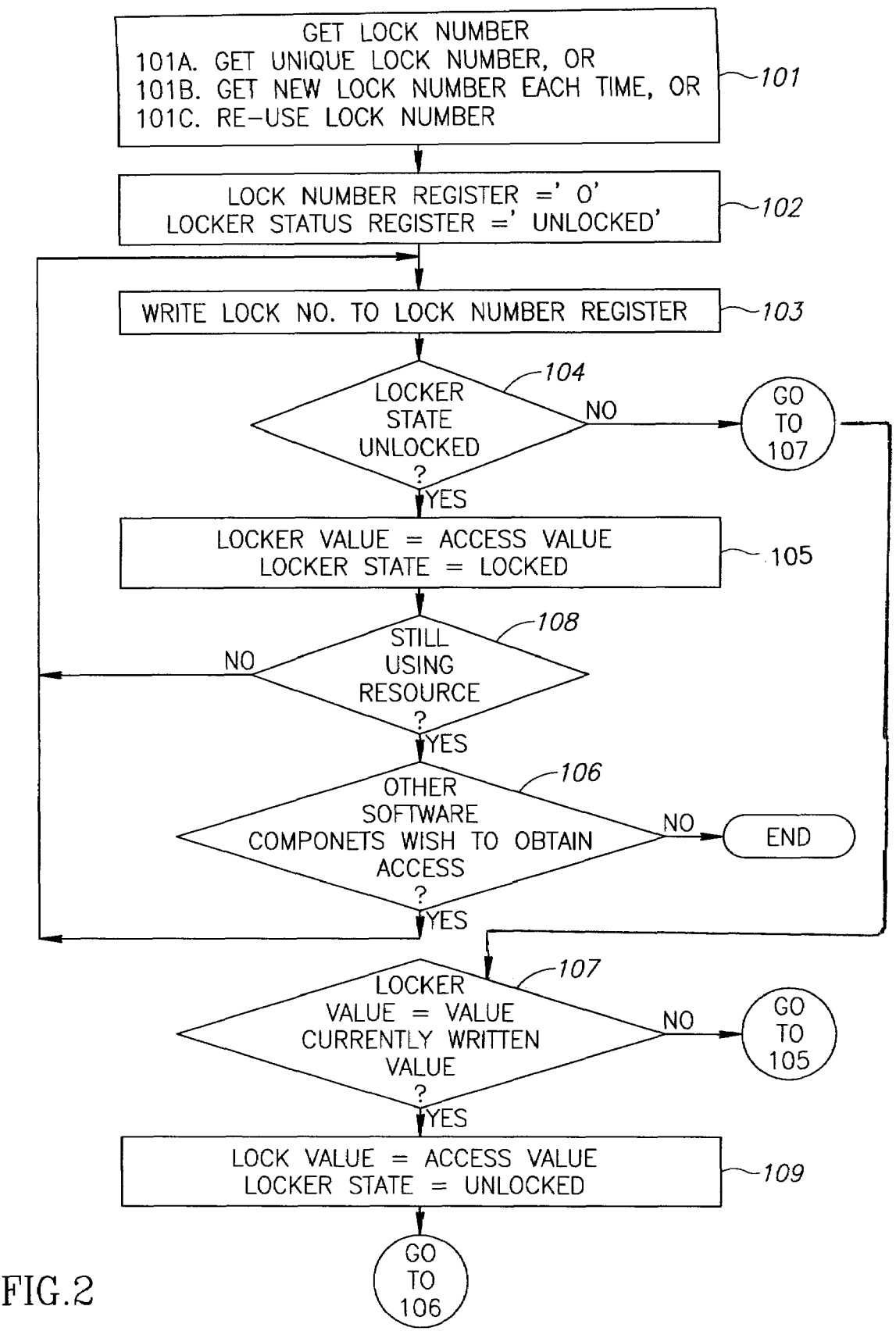
FIG. 2 is a simplified flow chart of managing access to the computer resources, in accordance with an embodiment of the present invention.
Figure 3A:
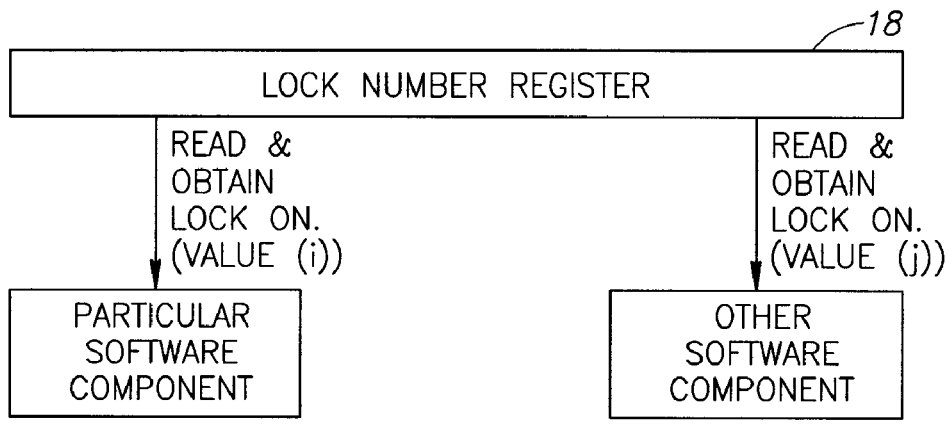
FIGS. 3A-3C are simplified block diagram illustrations of certain steps of the method shown in FIG. 2.
Figure 3B:
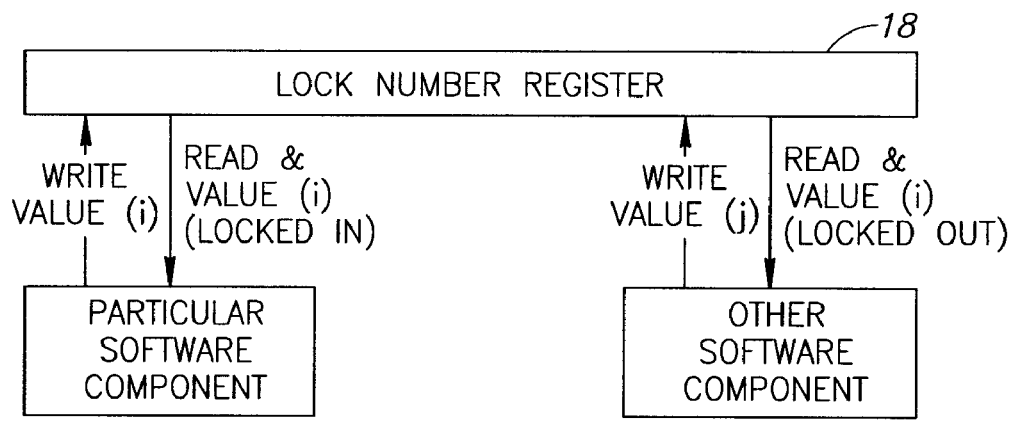
Figure 3C:
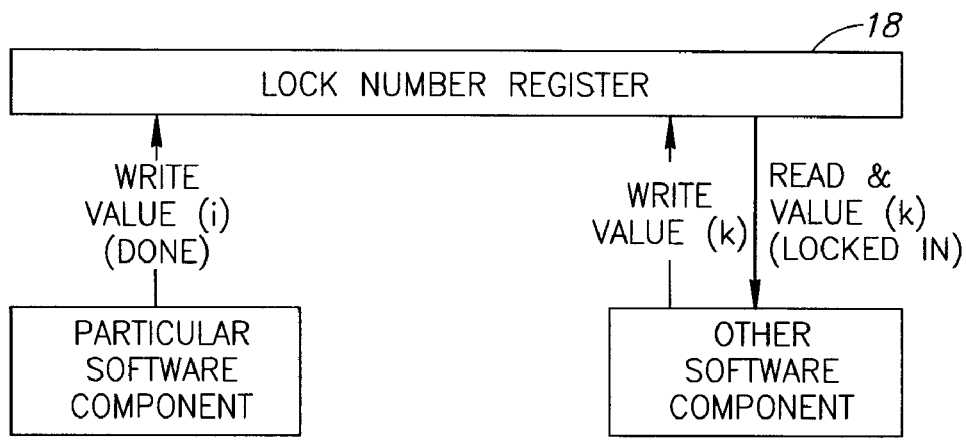

Reference is now made to FIG. 2, which illustrates a flow chart of a method managing access to computer resources 10, in accordance with an embodiment of the present invention, and to FIGS. 3A-3C, which illustrate in simplified block diagram form, certain steps of the method.

The software component 14 may obtain a lock number by reading the lock number register 18 (step 101, FIG. 2, and also shown in FIG. 3A). The lock number may be used by the software component 14 as an identification number. Each read operation from the lock number register 18 may return a sequentially increasing number. For example, the initial value of the lock number register 18 may be '0', wherein subsequent read operations would obtain '1', '2', etc. The invention is not limited to these values, however.

In accordance with a non-limiting embodiment of the present invention, each software component 14 may obtain a unique lock number, meaning that the lock number register 18 is read only once to obtain the lock number (step 101A). The unique lock number can be used to perform lock operations any number of times. ("Lock operation" encompasses attempting to gain access to a desired computer resource 10 and unlocking or locking access to that desired computer resource 10, as is explained below.) Alternatively, the invention also encompasses the possibility of making the software component 14 obtain a new lock number each time the software component 14 wishes to perform a lock operation (step 101B). As another alternative, the invention also encompasses the possibility of reusing lock numbers after reaching a predefined value (step 101C). For example, after using the values '0', '1', '2', ... 'ffff', the numbers would start again, that is, subsequent read operations would obtain '0', '1', '2', ... 'ffff', '0', '1', '2', ... 'ffff', ... etc. The predefined value could be set to a high value that would avoid a possible ambiguity of two different software components using the same lock number.

The locker value register 22 may be initialized to '0', and the locker status register 24 may be initialized to 'unlocked' (step 102).

If a particular software component 14 wishes to obtain access to the desired computer resource 10, it writes its assigned lock number value (e.g., 'Value(i)') to locker value register 22 (step 103). The locker logic may check if LockerState='Unlocked' (step 104).

The particular software component 14 may read from the locker value register 22. If the read value equals the value written by this particular software component 14, then exclusive access has been granted for this particular software component 14, and it can access the shared resource 10 (step 105, and also shown in FIG. 3B). In other words, the locker logic may behave as follows:

If LockerState='Unlocked', then LockerValue=currently written value='AccessValue' (in this example, 'Value(i)') and LockerState='Locked'.

Other software components 14 may wish to obtain access to the desired computer resource 10 (step 106). If so, that software component 14 may write its assigned lock number value (e.g., 'Value(j)', wherein j i) to locker value register 22 (step 103). However, as long as the locker state register 24 is locked, the currently written locker value will be checked against the stored LockerValue. The software component (with lock number Value(j)) would read a lock number from the locker value register 22 which is different from the written one. This would indicate that software component (with lock number Value(j)) cannot access the computer resource 10 because it is currently locked to another software component (step 107). The locker logic may behave as follows:

If LockerState='Locked' and LockerValue 'AccessValue', then LockerState='Locked' (i.e., remains locked) and LockerValue='AccessValue' (remains the same)—as in step 105.

Once the software component 14 that currently has exclusive access to the desired computer resource 10 has finished its communication with the desired computer resource 10 (step 108), it may once again write its assigned lock number value ('Value(i)') to locker value register 22 (step 103). The locker logic may behave as follows:

If LockerState='Locked' and LockerValue='Value(i)', then LockerState='Unlocked' (step 109, and also shown in FIG. 3C).

The management of the locker register 20 may continue as before. That is, after the locker register 20 has been unlocked, the next time another software component 14 wishes to obtain access to the desired computer resource 10 (step 106), it will write its assigned lock number value ('Value(k)', wherein k i) to the locker value register 22 (as in step 103), and the locker logic may behave as follows:

If LockerState='Unlocked', then LockerValue=currently written value='AccessValue' (in this example, 'Value(k)') and LockerState='Locked' (as in step 105, wherein the software component reads the locker value register 22).

It is noted that a read operation from the locker value register 22 of the locked locker register 20 returns the lock number of the locking component, whereas a read operation from the locker value register 22 of the unlocked locker register 20 returns the lock number of the last component that used the locker register 20.

The steps described above may be repeated any number of times by any number of software components 14. Only after the software component 14 that had been granted exclusive access to the desired computer resource 10 has finished its communication with the desired computer resource 10, access is granted to another software component 14.

It is noted that the methods shown in FIGS. 2 and 3A-3C and described hereinabove may be carried out by a computer program product 39 (FIG. 1), such as but not limited to, Network Interface Card, hard disk, optical disk, memory device and the like, which may include instructions for carrying out the methods described hereinabove.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for controlling access to a computer resource by multiple software components, the method comprising:
    managing access to the shared computer resource by a plurality of independent software components with a locker manager;
    allocating a unique lock number to each of the plurality of the independent software components with a lock number register located in the locker manager;
    storing said unique lock number for each of the independent software components in a locker register located in the locker manager;
    writing the unique lock number of a selected independent software component to the locker manager to check if the locker manager is locked whereby exclusive access has been granted to remaining other of the independent software components or unlocked whereby the selected independent software component is granted access to said shared computer resource; and
    granting access with the locker manager to the selected independent software component to said shared computer resource when the locker manager is unlocked and locking access to the shared computer resource with the locker manager to remaining other of the software components until said selected independent software component has finished accessing the shared computer resource.

2. The method according to claim 1, further comprising:
    allocating the unique lock number to each of the independent software components with a lock number register located within the locker manager;
    storing said unique lock number in a lock value register included in the locker register; and
    storing an indication of whether said locker manager is locked or unlocked in a lock status register included in the locker register.

3. The method according to claim 2, including the step of:
    writing the unique lock number of a remaining other of the independent software components to said lock value register whereby if said locker register is locked, then said lock register remains locked and said lock value register is unchanged.

4. The method according to claim 2, including the step of:
    writing the allocated lock number of said particular software component to said lock value register if said particular software component has finished communication with said particular computer resource, whereby said lock manager unlocks access to said shared computer resource and indicates that said lock register is unlocked.

5. The method according to claim 2, including the step of:
    providing a new lock number to each of the software components each time the software component wishes to access a computer resource.

6. The method according to claim 1, further comprising the step of:
    reusing lock numbers for allocation to the software components after reaching a predefined value.

7. A computer program product embodied on the computer readable medium for controlling access to a shared computer resource by multiple software components, the computer program product embodied on the computer readable medium comprising:
    a locker manager embodied as hardware for managing access to the shared computer resource by a plurality of independent software components embodied on the computer readable medium;
    a lock number register located in the locker manager for allocating a unique lock number to each of the plurality of the independent software components embodied on the computer readable medium;
    a locker register located in the locker manager for storing said unique lock number for each of the independent software components embodied on the computer readable medium;
    the computer program product further comprising instructions for writing the unique lock number of a selected independent software component to the locker manager to check if the locker manager is locked whereby exclusive access has been granted to remaining other of the independent software components or unlocked whereby the selected independent software component is granted access to said shared computer resource; and
    the computer program product embodied on the computer readable medium further comprising instructions for granting access with the locker manager to the selected independent software component to said shared computer resource when the locker manager is unlocked and locking access to the shared computer resource with the locker manager to remaining other of the software components until said selected independent software component has finished accessing the shared computer resource.

8. The computer program product embodied on the computer readable medium according to claim 7, wherein the computer program product embodied on the computer readable medium further comprises instructions for any of the other software components to read a register in said locker manager.

9. The computer program product embodied on the computer readable medium according to claim 7, wherein the computer program embodied on the computer readable medium product further comprises instructions that in said instructions for granting access with the locker manager to the selected independent software component to said shared computer resource, that if another of the software components writes its allocated lock number to said lock value register and said lock register is locked, then said lock register remains locked and said lock value register is unchanged.

10. The computer program product embodied on the computer readable medium according to claim 7, wherein the computer program product embodied on the computer readable medium further comprises that in said instructions, that if said particular software component has finished communication with said shared computer resource, said particular software component writes its allocated lock number to said lock value register and said lock manager unlocks access to said shared computer resource and indicates that said lock register is unlocked.

11. A distributed system for controlling access to shared computer resources by multiple software components embodied on a computer readable medium, the distributed system comprising:

a locker manager embodied as hardware for managing access to the shared computer resources by a plurality of independent software components embodied on a computer readable medium, said locker manager comprising a lock number register for allocating unique lock numbers to the plurality of software components embodied on the computer readable medium, and said locker manager comprising a locker register that comprises a locker value register for storing lock numbers and a locker status register for storing an indication whether said lock register is locked or unlocked; and wherein if said a particular software component embodied on the computer readable medium wishes to obtain access to one of said shared computer resources, said particular software component writes its allocated lock number to said locker value register and if the lock register is unlocked because the shared computer resource is not being used and is available, then said locker manager grants said particular software component access to said one of said shared computer resources and indicates that said locker register is locked; and wherein if said particular shared computer resource is not currently being used and is available, said locker manager grants a particular software component embodied on the computer readable medium access to said shared computer resource and locks access thereto, wherein none of the other software components can access said shared computer resource until said particular software component has finished accessing said shared computer resource.

12. The distributed system according to claim 11, wherein any of the other software components embodied on the computer readable medium reads a register in said locker manager in order to determine if access is available to said shared computer resource.

13. The distributed system according to claim 11, wherein if another of the software components embodied on the computer readable medium writes its assigned lock number to said locker value register and said lock register is locked, then said lock register remains locked and said lock value register is unchanged.

14. The distributed system according to claim 11, wherein if said particular software component embodied on the computer readable medium has finished communication with said shared computer resource, said particular software component writes its allocated lock number to said locker value register and said lock manager unlocks access to said shared computer resource and indicates that said locker register is unlocked.

15. The distributed system according to claim 11, wherein said system comprises a Remote Direct Memory Access (RDMA) enabled NIC (Network Interface Controller).

* * * * *